United States Patent
Rahbek

(10) Patent No.: US 10,501,931 B2
(45) Date of Patent: Dec. 10, 2019

(54) METHOD OF PRODUCING AN INSULATION PRODUCT AND A PRODUCT OBTAINED BY SAID METHOD

(71) Applicant: Rockwool International A/S, Hedehusene (DK)

(72) Inventor: Jens Eg Rahbek, Frederiksberg (DK)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 16/062,328

(22) PCT Filed: Dec. 7, 2016

(86) PCT No.: PCT/EP2016/079999
§ 371 (c)(1),
(2) Date: Jun. 14, 2018

(87) PCT Pub. No.: WO2017/102481
PCT Pub. Date: Jun. 22, 2017

(65) Prior Publication Data
US 2018/0371749 A1 Dec. 27, 2018

(30) Foreign Application Priority Data
Dec. 17, 2015 (EP) .................................... 15200751

(51) Int. Cl.
*E04B 1/80* (2006.01)
*B32B 5/00* (2006.01)
(Continued)

(52) U.S. Cl.
CPC .............. *E04B 1/806* (2013.01); *B29C 70/00* (2013.01); *B29C 70/682* (2013.01); *B29C 70/70* (2013.01); *B29D 99/001* (2013.01); *B32B 1/08* (2013.01); *B32B 3/04* (2013.01); *B32B 5/00* (2013.01); *B32B 5/16* (2013.01); *B32B 7/05* (2019.01); *B32B 7/08* (2013.01); *B32B 27/08* (2013.01);
(Continued)

(58) Field of Classification Search
CPC ....................................................... E04B 1/806
USPC .......................................................... 428/69
See application file for complete search history.

(56) References Cited

U.S. PATENT DOCUMENTS 2,779,066 A 1/1957 Gaugler et al.
3,848,398 A 11/1974 Suhr
(Continued)

FOREIGN PATENT DOCUMENTS

CA 1290677 C 10/1991
DE 202011050485 U1 10/2011
(Continued)

*Primary Examiner* — Brent T O'Hern
(74) *Attorney, Agent, or Firm* — Dinsmore & Shohl LLP

(57) ABSTRACT

The present invention concerns a method of producing an insulation product comprising a board of porous insulation material wrapped in a gas-impermeable foil, said method comprising the steps of providing a succession of porous insulation material boards on a first conveyor apparatus and feeding the boards on a second conveyor apparatus; providing wrapping foil and wrapping said foil to form a tube around the boards on said second conveyor apparatus, flushing the boards with an insulating gas, and sealing the wrapping foil at the ends of each board transverse to the direction of travel of the second conveyor apparatus.

9 Claims, 1 Drawing Sheet

(51) Int. Cl.
- B29C 70/00 (2006.01)
- F16L 59/02 (2006.01)
- F16L 59/04 (2006.01)
- F16L 59/06 (2006.01)
- B29D 99/00 (2010.01)
- B32B 5/16 (2006.01)
- B32B 7/08 (2019.01)
- B32B 27/08 (2006.01)
- B32B 27/12 (2006.01)
- B32B 27/14 (2006.01)
- B32B 1/08 (2006.01)
- B32B 3/04 (2006.01)
- B29C 70/68 (2006.01)
- B29C 70/70 (2006.01)
- B32B 7/05 (2019.01)
- B32B 5/26 (2006.01)
- B32B 37/18 (2006.01)
- B32B 38/00 (2006.01)

(52) U.S. Cl.
CPC .............. *B32B 27/12* (2013.01); *B32B 27/14* (2013.01); *F16L 59/026* (2013.01); *F16L 59/04* (2013.01); *F16L 59/06* (2013.01); *B32B 5/26* (2013.01); *B32B 37/182* (2013.01); *B32B 2038/0052* (2013.01); *B32B 2255/10* (2013.01); *B32B 2255/205* (2013.01); *B32B 2260/025* (2013.01); *B32B 2260/04* (2013.01); *B32B 2262/02* (2013.01); *B32B 2262/06* (2013.01); *B32B 2262/067* (2013.01); *B32B 2262/08* (2013.01); *B32B 2262/101* (2013.01); *B32B 2262/108* (2013.01); *B32B 2264/10* (2013.01); *B32B 2305/026* (2013.01); *B32B 2307/302* (2013.01); *B32B 2307/304* (2013.01); *B32B 2307/31* (2013.01); *B32B 2307/7242* (2013.01); *B32B 2309/66* (2013.01); *B32B 2419/00* (2013.01); *F25D 2201/124* (2013.01); *F25D 2201/128* (2013.01); *F25D 2201/14* (2013.01)

(56) References Cited

U.S. PATENT DOCUMENTS 5,094,899 A * 3/1992 Rusek, Jr. ............ B29C 70/504
428/69
2014/0360044 A1 12/2014 Smith

FOREIGN PATENT DOCUMENTS

| | | |
|---|---|---|
| EP | 1566337 A1 | 8/2005 |
| WO | 9603555 A1 | 2/1996 |
| WO | 2012164310 A2 | 12/2012 |

* cited by examiner

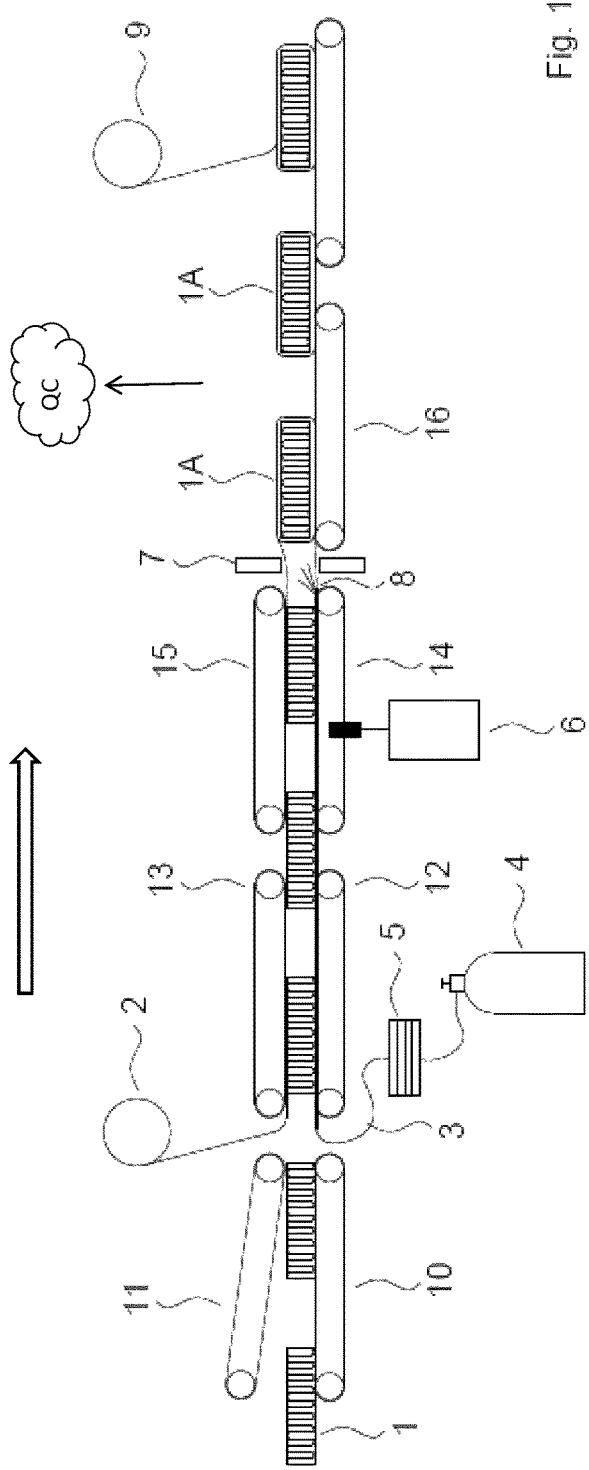
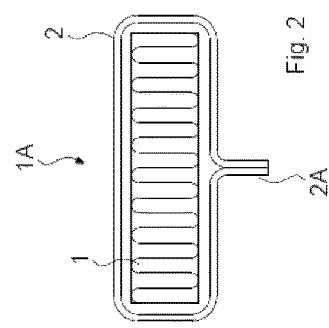

METHOD OF PRODUCING AN INSULATION PRODUCT AND A PRODUCT OBTAINED BY SAID METHOD

CROSS-REFERENCE TO RELATED APPLICATIONS

This application is the U.S. national stage of PCT/EP2016/079999 filed Dec. 7, 2016, which claims priority of European Patent Application 15200751.4 filed Dec. 17, 2015 of which is hereby incorporated by reference in its entirety.

FIELD OF THE INVENTION

The present invention relates to a method of producing an insulation product comprising a porous insulation material wrapped in a gas impermeable foil and containing an insulating gas, and a product obtained by said method.

BACKGROUND OF THE INVENTION

Products of thermally insulating material in hermetically sealed bags are well-known in the art, for instance so-called vacuum insulation panel (VIP).

Current VIP technology typically comprises an insulation material, e.g. formed of fumed silica, mineral fibres or other microporous material core. The core being wrapped in a flexible, gas-tight envelope and a vacuum is applied before sealing. The vacuum is essential to the panel's thermal insulating performance. If the vacuum disappears the panel loses a large proportion of its thermal properties, with the thermal conductivity reverting to that of the core material. Meaning, that all kind of piercing of the envelope due to one or more of handling damage, like e.g. cutting to size, fixing to a building substrate and damage caused by drilling of holes for wiring, shelf fixing and the like is very problematic and crucial to the panels. The before said being one of the reasons why the use of VIP technology in building construction nowadays is still not widespread. Moreover, in particular the use of mineral fibre materials has some additional drawbacks and as such these core materials would not be first choice. Thus, microporous materials would be needed which, however, are very expensive.

Another approach has earlier been proposed in providing hermetically sealing porous insulation material within sealed bags and substituting the contained air with a gas. Reference is e.g. made to U.S. Pat. No. 2,779,066, which relates to a refrigerating apparatus and more particularly to an improved arrangement for insulating the walls of such refrigerators. Provided is an improved and practical insulation in which gas having a low coefficient of thermal conductivity is used in combination with glass fibers or the like.

In WO 2012/164310 there are disclosed composite material panels comprising insulation layers comprising a solid open-cell foam panel, which may have at least one internal void therein, and wherein one or more surfaces of the panel and/or the voids are provided with an air-tight sealing coating. The internal void spaces may be evacuated or contain air or an inert gas at around atmospheric pressure.

WO 96/03555 discloses a lightweight, partially evacuated load-supporting insulation panel comprising an outer gas-impermeable envelope and an inner gas-permeable envelope. The inner envelope is filled with a mixture of coarse gas-permeable granules and fine gas permeable particles, void spaces formed within and between said granules and particles containing a gas of low thermal conductivity.

In CA 1290677 there is disclosed insulating panels which are formed from compressed particulate material impregnated with insulating gases, the combination being held in a gas tight pouch. These pouches can be placed in the insulation space of a structure where insulation is to be provided and, if desired, encapsulated in a foamed insulating material. Among the possible particulate materials is precipitated silica, while various Freon gases can be employed as the insulating gas.

Although an insulation product comprising a board of porous insulation material wrapped in a gas-impermeable foil and comprising an insulating gas is known as such, no such products have ever been introduced to the building sector since production has been a major challenge; hence there is no industrially suitable method of producing such products.

SUMMARY OF THE INVENTION

Therefore, it is an object of the present invention to provide a method of manufacturing such products with enhanced thermal properties where the production costs can be kept reasonably low and with a high production capacity.

This object is achieved by a method of producing an insulation product comprising a board of porous insulation material wrapped in a gas-impermeable foil, said method comprising the steps of providing a succession of porous insulation material boards on a first conveyor apparatus and feeding the boards on a second conveyor apparatus;

providing wrapping foil and wrapping said foil to form a tube around the boards on a flow-wrapping apparatus on said second conveyor apparatus, flushing the boards with an insulating gas, and sealing the wrapping foil at the ends of each board transverse to the direction of travel of the second conveyor apparatus.

Suitable porous insulation materials are in particular bound fibrous insulation materials, preferably bound mineral fibre products, like e.g. stone wool or glass wool products, but also bound natural fibre products, like e.g. wood fibres, vegetable or animal fibres, and moreover also synthetic or semi-synthetic fibres. Additionally porous mineral coarse or granular materials, like e.g. perlite, vermiculite or others, with or without the addition of a binding agent, might be suitable as well.

Hereby, an efficient production process is provided which is particularly suitable for large scale production of insulation boards for thermal insulation of building elements or similar structures.

The result of this manufacturing method is a series of insulation boards where the air in the porous insulation material is substituted with an insulating gas leaving only a small amount of air inside the package. This decreases the thermal insulation value, i.e. the thermal conductivity value, and provides better thermal performance of the resulting products.

Typically a commonly known mineral fibre board nowadays can have a thermal conductivity ($\lambda$) of 32 mW/(m*K). By wrapping the board with a gas-impermeable foil and substituting the air with $CO_2$ the thermal conductivity can be reduced with approx. 10 mW/(m*K). This has both been calculated from the thermal conductivity values of the gasses ($\lambda_{air}$=26 mW/(m*K)–$\lambda_{CO2}$=16 mW/(m*K) thus resulting in a reduction of approx. 10 mW/(m*K)) and proven based on actual measurements on respective insulation products being produced according to the method of the present invention.

Thermal conductivity values for different gasses can be found on the following chart giving the thermal conductivity of gases as a function of temperature.

Unless otherwise noted in the chart, the values refer to a pressure of 100 kPa (1 bar) or to the saturation vapour pressure if that is less than 100 kPa. The notation P=0 indicates the low pressure limiting value is given. In general, the P=0 and P=100 kPa values differ by less than 1%.
Units: mW/m K (milliwatts per meter kelvin)

| MF | Name | 100 K | 200 K | 300 K | 400 K | 500 K | 600 K |
|---|---|---|---|---|---|---|---|
| — | Air | 9.4 | 18.4 | 26.2 | 33.3 | 39.7 | 45.7 |
| Ar | Argon | 6.2 | 12.4 | 17.9 | 22.6 | 26.8 | 30.6 |
| $BF_3$ | Boron trifluoride | — | — | 19.0 | 24.6 | — | — |
| $H_2$ | Hydrogen (P = 0) | 68.6 | 131.7 | 186.9 | 230.4 | — | — |
| $F_6S$ | Sulfur hexafluoride (P = 0) | — | — | 13.0 | 20.6 | 27.5 | 33.8 |
| $H_2O$ | Water | — | — | 18.7 | 27.1 | 35.7 | 47.1 |
| $H_2S$ | Hydrogen sulfide | — | — | 14.6 | 20.5 | 26.4 | 32.4 |
| NH3 | Ammonia | — | — | 24.4 | 37.4 | 51.6 | 66.8 |
| He | Helium (P = 0) | 75.5 | 119.3 | 156.7 | 190.6 | 222.3 | 252.4 |
| Kr | Krypton (P = 0) | 3.3 | 6.4 | 9.5 | 12.3 | 14.8 | 17.1 |
| NO | Nitric oxide | — | 17.8 | 25.9 | 33.1 | 39.6 | 46.2 |
| $N_2$ | Nitrogen | 9.8 | 18.7 | 26.0 | 32.3 | 38.3 | 44.0 |
| $N_2O$ | Nitrous oxide | — | 9.8 | 17.4 | 26.0 | 34.1 | 41.8 |
| Ne | Neon (P = 0) | 22.3 | 37.6 | 49.8 | 60.3 | 69.9 | 78.7 |
| $O_2$ | Oxygen | 9.3 | 18.4 | 26.3 | 33.7 | 41.0 | 48.1 |
| $O_2S$ | Sulfur dioxide | — | — | 9.6 | 14.3 | 20.0 | 25.6 |
| Xe | Xenon (P = 0) | 2.0 | 3.6 | 5.5 | 7.3 | 8.9 | 10.4 |
| $CCl_2F_2$ | Dichlorodifluoromethane | — | — | 9.9 | 15.0 | 20.1 | 25.2 |
| $CF_4$ | Tetrafluoromethane (P = 0) | — | — | 16.0 | 24.1 | 32.2 | 39.9 |
| CO | Carbon monoxide (P = 0) | — | — | 25.0 | 32.3 | 39.2 | 45.7 |
| $CO_2$ | Carbon dioxide | — | 9.6 | 16.8 | 25.1 | 33.5 | 41.6 |
| $CHCl_3$ | Trichloromethane | — | — | 7.5 | 11.1 | 15.1 | — |
| $CH_4$ | Methane | — | 22.5 | 34.1 | 49.1 | 66.5 | 84.1 |
| $CH_4O$ | Methanol | — | — | — | 26.2 | 38.6 | 53.0 |
| $C_2H_2$ | Acetylene | — | — | 21.4 | 33.3 | 45.4 | 56.8 |
| $C_2H_4$ | Ethylene | — | 11.1 | 20.5 | 34.6 | 49.9 | 68.6 |
| $C_2H_6$ | Ethane | — | 11.0 | 21.3 | 35.4 | 52.2 | 70.5 |
| $C_2H_6O$ | Ethanol | — | — | 14.4 | 25.8 | 38.4 | 53.2 |
| $C_3H_6O$ | Acetone | — | — | 11.5 | 20.2 | 30.6 | 42.7 |
| $C_3H_8$ | Propane | — | — | 18.0 | 30.6 | 45.5 | 61.9 |
| $C_4H_{10}$ | Butane | — | — | 16.4 | 28.4 | 43.0 | 59.1 |
| $C_5H_{12}$ | Pentane | — | — | 14.4 | 24.9 | 37.8 | 52.7 |
| $C_6H_{14}$ | Hexane | — | — | — | 23.4 | 35.4 | 48.7 |

Source: https://www.engineersedge.com/heat_transfer/thermal-conductivity-gases.htm The thermal conductivity values for a product according to the invention have been measured. The measured values mentioned below are mean values $\lambda_{mean}$ based on n=9 measurements:
Stone wool with air: $\lambda_{mean}$=32 mW/(m*K)
Stone wool with argon: $\lambda_{mean}$=24 mW/(m*K)
Stone wool with $CO_2$: $\lambda_{mean}$=22 mW/(m*k)
The measurements are done according to European Standard EN12667 with a reference mean temperature of 10° C.

The wrapping process is a flow-wrapping process. By flushing the porous insulation material before completing the wrapping process the air inside the porous insulation material is substituted with the insulating gas. This is advantageous compared to creating a vacuum and evacuating the air from the inside of the insulation material because this allows for a continuous manufacturing process of the insulation products which is easier and more quickly, resulting in a more efficient and reliable production process with very low production costs.

In a preferred embodiment, a compressing of the insulation material is provided on the first conveyor apparatus. This ensures that the pressure inside the finished boards will be slightly lower than the ambient air pressure. This secures a reduction of the risk of overpressure due to heat or ambient pressure drop during the use of the insulation boards when installed in a building structure or the like.

Preferably, the pre-compression is maintained until the sealing of the ends of the boards has been performed. When the compression is released after the sealing of the package the expansion of the insulation material will result in a lower pressure inside the package.

As an alternative or as a supplement to the pre-compression, a pre-heating of the insulation material may be provided on the first conveyor apparatus. This is also advantageous in order to achieve that the pressure is lower inside the package than the ambient pressure, since when the porous insulation material and thereby also the insulating gas cools after the sealing the pressure inside the package will decrease proportionally.

In an embodiment, a pre-heating of the insulating gas is provided prior to flushing the interior of the tubular wrapping foil. This increases the pre-heating effect and thereby also the subsequent creation of a lower pressure inside the package.

The step of flushing preferably includes flushing the interior of said tubular wrapping foil and the boards therein with an insulating gas. This ensures a substitution of the air inside the tubular wrapping foil with the insulating gas during the flow-wrapping process just before the end sealing of the boards. Hereby, the step of gas flushing preferably substitutes between 80-98% of the air inside the tubular wrapping foil with the insulating gas and thereby also substitutes the air in the porous insulation material boards.

Advantageously, the insulating gas used for the gas flushing is at least one gas selected from a group consisting of Carbondioxide ($CO_2$), Argon or other gasses having an thermal conductivity lower than that of air.

In a preferred embodiment of the invention, the wrapping foil is a multilayer plastic foil and the forming of the tubular wrapping foil comprises forming and longitudinal welding of the wrapping foil. Accordingly, the end sealing may be a thermoplastic welding across the tubular wrapping foil.

In a second aspect of the invention, an insulation product is provided which comprises a board of porous insulation material wrapped in a gas-impermeable foil, wherein product is obtained by performing the method according to the first aspect of the invention. Preferably, the porous insulation material is fibrous mineral wool, such as stone wool or glass wool.

As explained above, it is advantageous that the entrapped gas inside the porous insulation material is at sub-atmospheric pressure, so that any heat expansion of the insulating product during use is absorbed.

Preferably, the entrapped gas in the product is at least 80% insulating gas, such as Carbondioxide ($CO_2$), Argon or the like gas or gasses having a thermal conductivity lower than that of air.

The wrapping foil is advantageously a multilayer plastic foil comprising a metallised plastic foil and an exterior thermoplastic layer. Unlike an aluminium foil, a metallised plastic foil does not form any thermal bridging in the insulation. By using a metallised foil a gas-tight foil no thermal bridging in the insulation is introduced. By ensuring a thermoplastic interior layer on the multilayer foil, it is ensured that the foil may be heat-sealed, i.e. welded together.

BRIEF DESCRIPTION OF THE DRAWINGS

The invention is disclosed in further detail with reference to the accompanying drawing, in which:

FIG. 1 is a schematic illusion of the production process for manufacturing an insulation product comprising a board of porous insulation material wrapped in a gas-impermeable foil, and FIG. 2 is a schematic cross-sectional view of an insulation product resulting from the production process.

DETAILED DESCRIPTION OF THE INVENTION

With reference to the FIG. 1, the production of the insulation products according to a preferred embodiment of the invention starts with cutting the porous insulation material into the desired dimensions making up the insulation board 1. The boards 1 are sequentially fed in a continuous manner onto a first conveyor 10. The porous insulation material is preferably stone wool with a density in the range of 30-120 kg/m$^3$, glass wool in the density range of 15-60 kg/m$^3$ or other porous insulation materials. The production flow direction is indicated by the arrow in FIG. 1.

The boards 1 may preferably be mechanically compressed, such as between 5-20%, more preferably 10-15%, by a first upper conveyor belt 11 or the like. Said compression is determined by the final height of the opening at the conveyor belt 11 respectively between the upper and lower part of the following conveyer belts 12, 13 compared with the nominal thickness of the insulation material. In the first conveyor apparatus 10, 11 there could advantageously also be provided means for heating up the boards 1, such as heating the boards to a temperature of 30-120° C.

The boards 1 are fed into a Horizontal Flow Pack Machinery (flow-packer) 20, which includes a second set of conveyors 12, 13 and a third set of conveyors 14 and 15. The flow-packer 20 feeds the wrapping foil 2 to the boards 1 on the second lower conveyor 12 while the second upper conveyor 13 and further the third lower conveyor 14 and the third upper conveyor 15 maintain the compression of the boards 1. The foil is then folded or bent into a tubular shape (not shown) and a longitudinal sealer 6 is provided providing the welding seal 2A as shown in FIG. 2. Preferably, the flow-packer heats up the insulation to 30-80° C., and also wraps a gastight foil 2 around the boards 1, flush the insulation boards 1 with an insulating gas through a gas flushing pipe 3, and seals the end at the end sealing station 7. The insulating gas is supplied from a gas source 4 and preferably heated to a temperature of 30-120° C., before being fed through the gas pipe 3 and into the wrapping foil formed in a tubular configuration around the boards in the flow-packer 20.

The result of this process is an insulation board 1 where the air in the porous insulation material is substituted with an insulating gas leaving around 2-15% of air in pack 1A. This increases the thermal insulation properties compared to insulation boards without a gas-tight wrapping and with air inside the insulation material. By a process according to the present invention the thermal conductivity value of such product is therefore significantly decreased.

By compressing the core material and/or by heating the material and the gas, the pressure inside the finished boards 1A will be lower than the ambient air pressure. This reduces the risk of overpressure due to heat or ambient pressure drop during the use of the insulation boards 1A.

The pre-compressing of the insulation material secures a lower pressure in the sealed finished product 1A as the foil 2 is packed tight around the insulation material 1. The insulation material boards 1 are therefore preferably compressed before and under the packing, such as by the first, second and third upper conveyors 11, 13, 15. When the compression is released after sealing the package 1A at the sealing station 7 the expansion of the insulation material will result in a lower pressure inside the package.

Another way to secure a pressure inside the pack that is always lower than the ambient pressure is to heat up the insulation material board 1 and the insulating gas. When the insulating gas cools off after sealing the pressure inside the finished product will decrease. By the invention it is realised that apart from individually also both process steps, the pre-compression and the pre-heating may be used in order to achieve the lower pressure inside the finished product.

After the sealing at the sealing station 7 where the products are also separated from each other, the finished products are transported to further processing, such as packaging on a fourth conveyor system 16. A quality control step QC may also be provided at this fourth conveyor system 16, as indicated in FIG. 1, wherein the thermal conductivity may be measured.

An additional process step 9 may be provided (see FIG. 1). This additional step 9 is an optional additional protection wrapping or covering, which is applied to the finished boards 1A. Hereby, a protection of the board 1A is achieved from the damages mentioned in the introduction of the description.

The finished boards 1A comprise a core of porous insulation material 1, which may be mineral wool or other open porous insulation material, which is wrapped in a gastight foil 2. The foil 2 is preferably a thermoplastic multilayer foil 2 with a metallised plastic foil layer to secure the gas-impermability of the foil 2. Further the multilayer foil 2 preferably has an exterior layer which is weldable in order to use a heat-sealing process for the longitudinal sealing at the station 6 and for the end sealing 7. By the process shown in FIG. 1 the air in the boards 1 is replaced with an insulating gas 3. The gas can be $CO_2$, Argon or another insulating gas. By replacing the air with an insulating gas the thermal conductivity of the product can be reduced significantly.

REFERENCES

1 Porous insulation board
1A Packed insulation board
2 Gastight foil
2A Bottom sealing/welding seal
3 Gas lance
4 Insulating gas
5 Possible preheating of insulating gas
6 Bottom sealer
7 End sealer
8 Gas lance outlet
9 Optional additional protection wrapping
10 First lower conveyor for compression and potentially also of preheating
11 First upper conveyor for compression and potentially also of preheating
12 Second lower conveyor
13 Second upper conveyor
14 Third lower conveyor
15 Third upper conveyor
16 Fourth conveyor system

The invention claimed is:

1. A method of producing an insulation product comprising a board of porous insulation material wrapped in a gas-impermeable foil, the method comprising the steps of:
providing a succession of porous insulation material boards on a first conveyor apparatus and feeding the boards on a second conveyor apparatus;
providing wrapping foil and a flow-wrapping apparatus on the second conveyor apparatus, and wrapping the wrapping foil to form a tubular wrapping foil with a tubular configuration around the boards on the flow-wrapping apparatus on the second conveyor apparatus;
flushing the boards with an insulating gas; and then
sealing the wrapping foil at a front end and a rear end of each board transverse to a direction of travel of the second conveyor apparatus.

2. The method according to claim 1, further comprising pre-compressing the porous insulation material on the first conveyor apparatus, the pre-compressing being within a range of 5-20% of a nominal thickness of the porous insulation material.

3. The method according to claim 2, wherein the pre-compression is maintained until the step of sealing of the wrapping foil at the front end and the rear end of the board has been performed.

4. The method according to claim 1, further comprising pre-heating the porous insulation material on the first conveyor apparatus.

5. The method according to claim 1, further comprising preheating the insulating gas to obtain a pre-heated insulating gas prior to flushing an interior of the tubular wrapping foil with the pre-heated insulating gas.

6. The method according to claim 5, wherein the step of flushing further comprise flushing the interior of the tubular wrapping foil and the boards with the insulating gas.

7. The method according to claim 6, wherein the step of flushing substitutes between 80-98% of an air inside the tubular wrapping foil and the boards with the insulating gas.

8. The method according to claim 5, further comprising selecting the insulating gas from the group consisting of Carbondioxide ($CO_2$), Argon or other gases having thermal conductivity lower than air.

9. The method according to claim 1, wherein the wrapping foil is a multilayer plastic foil, and the step of forming the tubular wrapping foil further comprises longitudinal welding of the wrapping foil.

* * * * *